(12) United States Patent
Taniguchi et al.

(10) Patent No.: US 11,791,504 B2
(45) Date of Patent: Oct. 17, 2023

(54) BATTERY PACK AND CHARGING CONTROL METHOD THEREFOR

(71) Applicant: SANYO Electric Co., Ltd., Daito (JP)

(72) Inventors: Keitaro Taniguchi, Hyogo (JP); Ryoji Watanabe, Osaka (JP)

(73) Assignee: PANASONIC ENERGY CO., LTD., Osaka (JP)

( * ) Notice: Subject to any disclaimer, the term of this patent is extended or adjusted under 35 U.S.C. 154(b) by 78 days.

(21) Appl. No.: 17/040,164

(22) PCT Filed: Feb. 8, 2019

(86) PCT No.: PCT/JP2019/004528
§ 371 (c)(1),
(2) Date: Sep. 22, 2020

(87) PCT Pub. No.: WO2019/187692
PCT Pub. Date: Oct. 3, 2019

(65) Prior Publication Data
US 2021/0119273 A1    Apr. 22, 2021

(30) Foreign Application Priority Data

Mar. 30, 2018    (JP) ................................ 2018-066682

(51) Int. Cl.
*H01M 10/44*    (2006.01)
*H01M 10/48*    (2006.01)
(Continued)

(52) U.S. Cl.
CPC ......... *H01M 10/441* (2013.01); *H01M 10/48* (2013.01); *H01M 10/482* (2013.01);
(Continued)

(58) Field of Classification Search
CPC ............... H01M 10/441; H01M 10/482; H02J 7/007182; H02J 7/00714
See application file for complete search history.

(56) References Cited

U.S. PATENT DOCUMENTS 2,663,800 A * 12/1953 Herzog .................. H03K 4/501
331/109
4,251,848 A * 2/1981 Dogadko ............. H03K 17/292
361/205
(Continued)

FOREIGN PATENT DOCUMENTS

EP    2131470 A2    12/2009
JP    5-308733 A    11/1993
(Continued)

OTHER PUBLICATIONS

International Search Report dated Apr. 9, 2019, issued in counterpart Application No. PCT/JP2019/004528 (2 pages).
(Continued)

*Primary Examiner* — Drew A Dunn
*Assistant Examiner* — Pamela J Jeppson
(74) *Attorney, Agent, or Firm* — WHDA, LLP

(57) ABSTRACT

A battery pack includes: a charging voltage detector for detecting charging voltage applied to a charging path; a charging first transistor disposed in series on the charging path for controlling charging current flowing through the charging path; a charging second transistor for controlling operation of the charging first transistor; and a controller for controlling operation of the charging first transistor and the charging second transistor. Based on the charging current detected by a charging current detector and the charging voltage detected by the charging voltage detector, the controller can adjust the charging current for charging the battery block, by controlling second ON resistance that is ON resistance of the charging second transistor in a linear
(Continued)

region of the charging second transistor, and by controlling first ON resistance that is ON resistance of the charging first transistor in a linear region of the charging first transistor using the second ON resistance.

8 Claims, 10 Drawing Sheets

(51) Int. Cl.
  *H01M 50/569* (2021.01)
  *H02K 7/00* (2006.01)
  *H02J 7/00* (2006.01)
(52) U.S. Cl.
  CPC ....... *H01M 50/569* (2021.01); *H02J 7/00714* (2020.01); *H02J 7/007182* (2020.01)

(56) References Cited

U.S. PATENT DOCUMENTS

| | | | | |
|---|---|---|---|---|
| 2001/0054880 | A1* | 12/2001 | Haraguchi | H02J 7/0016 320/134 |
| 2003/0223162 | A1* | 12/2003 | Ausserlechner | H03F 1/523 361/42 |
| 2005/0052168 | A1 | 3/2005 | Tazawa et al. | |
| 2005/0275379 | A1* | 12/2005 | Tsukamoto | H02J 7/0072 320/134 |
| 2009/0295334 | A1 | 12/2009 | Yang et al. | |
| 2010/0033129 | A1 | 2/2010 | Li | |
| 2011/0074356 | A1 | 3/2011 | Yamazaki et al. | |
| 2011/0109275 | A1* | 5/2011 | Taniguchi | H02J 7/00302 320/145 |
| 2012/0081068 | A1* | 4/2012 | Odaohhara | H02J 7/00714 320/107 |
| 2013/0093238 | A1* | 4/2013 | Gao | H02J 7/0031 307/9.1 |
| 2014/0085945 | A1 | 3/2014 | Kuang et al. | |
| 2014/0375279 | A1 | 12/2014 | Nishino et al. | |
| 2018/0309172 | A1 | 10/2018 | Ito et al. | |
| 2019/0222041 | A1 | 7/2019 | Liu et al. | |

FOREIGN PATENT DOCUMENTS

| | | |
|---|---|---|
| JP | 2005-086931 A | 3/2005 |
| JP | 2005-354872 A | 12/2005 |
| JP | 2007-336698 A | 12/2007 |
| JP | 2009-296873 A | 12/2009 |
| JP | 2016-163467 A | 9/2016 |
| WO | 2013/046690 A1 | 4/2013 |
| WO | 2017/002526 A1 | 1/2017 |
| WO | 2018/054142 A1 | 3/2018 |

OTHER PUBLICATIONS

Extended (Supplementary) European Search Report dated Mar. 15, 2021, issued in counterpart EP application No. 19777235.3. (8 pages).
International Search Report dated Apr. 9, 2019, issued in counterpart Application No. PCT/JP2019/004529 (2 pages).
English Translation of Chinese Office Action dated Mar. 23, 2023, issued in counterpart CN application No. 201980012971.9. (6 pages).
The Office Action dated May 22, 2023, issued in counterpart to EP Application No. 19777235.3.(6 pages).

* cited by examiner

BATTERY PACK AND CHARGING CONTROL METHOD THEREFOR

TECHNICAL FIELD

The present invention relates to a battery pack and a charging control method therefor.

BACKGROUND ART

A battery pack in which a plurality of secondary battery cells is connected in series or in parallel to increase output and capacity is used as a power source for electric wheelchairs, assisted bicycles, and the like. In such a battery pack, the plurality of secondary battery cells is connected in series or in parallel to increase the capacity and voltage. The battery pack can also be connected to a charger and reused as a rechargeable battery pack.

However, when the battery pack deteriorates over time due to use, even if the battery pack is connected to the charger, a protection circuit will be activated and charging will be completed before the battery pack is fully charged. Thus, the capacity is relatively low as compared with an initial stage. For example, the initial battery pack can be charged to almost 100% of the capacity and used, but due to deterioration over time, charging can be performed only to a state in which remaining capacity is about 90%.

CITATION LIST

Patent Literature

PTL 1: Unexamined Japanese Patent Publication No. 2009-296873

SUMMARY OF THE INVENTION

The present invention has been made, in view of such a background, and an object of the present invention is to provide a battery pack and a charging control method therefor in which charging control can be flexibly performed.

According to a battery pack of a first aspect of the present invention, the battery pack includes: a battery block formed by connecting a plurality of secondary battery cells in series and/or in parallel to each other: a charging path that the battery block is charged; a charging current detector that detects charging current flowing through the charging path; a charging voltage detector that detects charging voltage applied to the charging path; a charging first transistor disposed in series on the charging path, the charging first transistor controlling the charging current flowing through the charging path; a charging second transistor that controls operation of the charging first transistor: and a controller that controls operation of the charging first transistor and the charging second transistor. Based on the charging current detected by the charging current detector and the charging voltage detected by the charging voltage detector, the controller can adjust the charging current for charging the battery block, by controlling second ON resistance that is ON resistance of the charging second transistor in a linear region of the charging second transistor, and by controlling first ON resistance that is ON resistance of the charging first transistor in a linear region of the charging first transistor using the second ON resistance. With the above configuration, the controller does not directly control the charging first transistor, but controls the charging current through the charging second transistor, by changing the second. ON resistance of the charging second transistor in the linear region, and by similarly changing the first ON resistance of the charging first transistor in the linear region. Therefore, it is possible to perform fine charging control with a light load, as compared with conventional ON/OFF control of a transistor.

Further, according to the battery pack of a second aspect, in addition to the above configuration, a low-pass circuit connected to a gate side of the charging second transistor can be further provided. With the above configuration, it is possible to reduce influence of ripple voltage fluctuations due to PWM control from the controller with the low-pass circuit.

Furthermore, according to the battery pack of a third aspect, in addition to any of the above configurations, a third resistor connected in parallel between a source and a drain of the charging second transistor; and a charging third transistor connected in series with the third resistor can be further provided. With the above configuration, by expanding the linear region of the second ON resistance of the charging second transistor, it is possible to obtain an advantage in suppressing ripple fluctuations of the charging current.

Furthermore, according to the battery pack of a fourth aspect, in addition to any of the above configurations, the controller can perform constant power control on the charging first transistor and control to adjust the charging current of the battery block. With the above configuration, it is possible to suppress loss of the charging first transistor to be constant and suppress an amount of heat generation.

Furthermore, according to the battery pack of a fifth aspect, in addition to any of the above configurations, a charging semiconductor element disposed on the charging path in series with the charging first transistor for controlling the charging current flowing through the charging path can be provided.

Furthermore, according to the battery pack of a sixth aspect, in addition to any of the above configurations, the charging first transistor and/or the charging second transistor can be constituted of field effect transistors (FETs)/an FET.

Furthermore, according to a charging and discharging control method for a battery pack according to a seventh aspect, the battery pack includes a battery block formed by connecting a plurality of secondary battery cells in series and/or in parallel to each other, a charging path that the battery block is charged, a charging current detector that detects charging current flowing through the charging path, a charging voltage detector that, detects charging voltage applied to the charging path, a charging first transistor disposed in series on the charging path, the charging first transistor controlling the charging current flowing through the charging path, a charging second transistor that controls operation of the charging first transistor, and a controller that controls operation of the charging first transistor and the charging second transistor. The charging control method for the battery pack can include: detecting charging current for charging the battery block by the charging current detector, and detecting charging voltage for charging the battery block by the charging voltage detector; and adjusting the charging current for charging the battery block by the controller based on the detected charging current and the detected charging voltage, by controlling second ON resistance that is ON resistance of the charging second transistor in a linear region of the charging second transistor, and by controlling first ON resistance that is ON resistance of the charging first transistor in a linear region of the charging first transistor using the second ON resistance.

According to the battery pack and the charging control method therefor according to the present invention, the controller does not directly control the charging first transistor, but controls the charging current through the charging second transistor, by changing the second ON resistance of the charging second transistor in the linear region, and by similarly changing the first ON resistance of the charging first transistor in the linear region. Therefore, it is possible to perform fine charging control with a light load as compared with conventional ON/OFF control of a transistor.

DESCRIPTION OF EMBODIMENT

Figure 1:
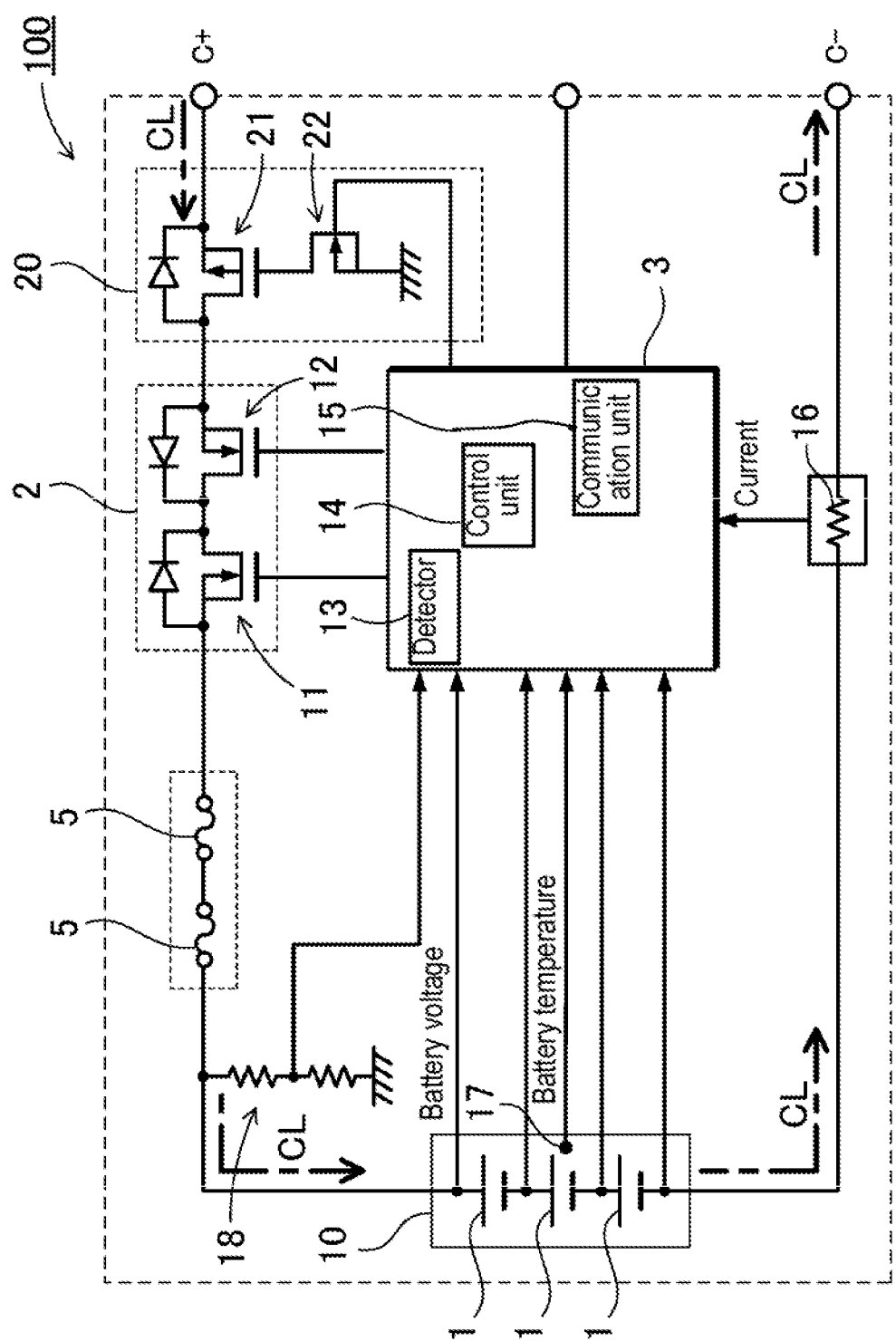
FIG. 1 is a block diagram of a battery pack according to a first exemplary embodiment of the present invention.

An exemplary embodiment or an example of the present invention is described below with reference to the drawings. However, the following exemplary embodiment or example is an example for embodying a technical idea of the present invention, and the present invention is not limited to the following. Further, in the present description, members shown in the scope of claims are not limited to the members of the exemplary embodiment. Especially, it is not intended that the scope of the present invention be limited only to the sizes, materials, and shapes of components and relative arrangement between the components described in the exemplary embodiment unless otherwise specified. The sizes and the like are mere explanation examples. The sizes and the positional relation of the members in each drawing are sometimes exaggerated for clearing the explanation. Furthermore, in the following explanation, the same names or the same reference marks denote the same members or same-material members, and detailed description is appropriately omitted. Furthermore, regarding the elements constituting the present invention, a plurality of elements may be formed of the same member, and one member may serve as the plurality of elements. Conversely, the function of one member may be shared by the plurality of members.

First Exemplary Embodiment

Hereinafter, as one exemplary embodiment of the present invention, a battery pack including a battery block formed by connecting a plurality of chargeable and dischargeable secondary battery cells in series will be described in detail. Battery pack 100 shown in a circuit diagram of FIG. 1 includes battery block 10 formed by connecting a plurality of chargeable and dischargeable secondary battery cells 1 in series, input and output switch 2 connected in series to an output side of battery block 10, controller 3 that detects voltage of each secondary battery cell 1 constituting battery block 10 and controls ON/OFF of input and output switch 2. Further, battery pack 100 includes fuse 5 connected in series with battery block 10 and melted when secondary battery cell 1 is abnormal to cut off current of battery block 10. Furthermore, battery pack 100 includes current detection resistor 16 as a charging current detector that detects charging current flowing through charging path CL and voltage detection resistor 18 as a charging voltage detector that detects charging voltage applied to battery block 10 or the like.

Secondary Battery Cell 1

Secondary battery cell 1 is a secondary battery that can be charged and discharged. In battery pack 100, a lithium ion secondary battery is used as secondary battery cell 1. The lithium ion secondary battery has large charging and discharging capacity with respect to capacity and weight, and can increase the charging and discharging capacity by making an outer shape of the battery pack small and reducing weight of the battery pack. However, in the battery pack of the present invention, it is possible to use any other secondary battery that can be charged and discharged instead of the lithium ion secondary battery.

Battery Block 10

Battery pack 100 includes the plurality of secondary battery cells 1, and these secondary battery cells 1 are connected in series to form battery block 10. Battery pack 100 shown in FIG. 1 has three secondary battery cells 1 connected in series. However, in the present invention, a number of secondary battery cells connected in series to each other is not limited to three, and can be two, four, or more.

Input and Output Switch 2

Input and output switch 2 is a switch that can be turned ON/OFF to prevent overcharge of charging secondary battery cell 1 and overdischarge of discharging secondary battery cell 1, and a semiconductor switching element such as an FET or a transistor is used. This input and output switch 2 is a charging and discharging switch that controls charging and discharging current of secondary battery cell 1, and includes charging switch 11 that prevents overcharge of secondary battery cell 1 by cutting off the charging current and discharging switch 12 that prevents overdischarge of secondary battery cell 1 by cutting off the discharging current. For these charging switch 11 and discharging switch 12, the semiconductor switching element such as the FET or a bipolar transistor is used.

In input and output switch 2 shown in FIG. 1, two sets of FETs are connected in series, one FET is used as charging semiconductor element 11, and another FET is used as discharging semiconductor element 12. Charging semiconductor element 11 is turned OFF when charging of secondary battery cell 1 is stopped, and discharging semiconductor element 12 is turned OFF when discharging of secondary battery cell 1 is stopped. When secondary battery cell 1 is charged and discharged, discharging semiconductor element 11 and charging semiconductor element 12 are held in an ON state. Each FET is connected in parallel with a diode that conducts electricity in an opposite direction in an OFF state. Therefore, the discharging current can be made to flow when remaining capacity becomes maximum capacity and charging cannot be performed as charging semiconductor element 11 is turned OFF, and the charging current can be made to flow even when discharging semiconductor element 12 is turned OFF, that is, when remaining capacity becomes minimum capacity and charging is stopped. Discharging semiconductor element 12 and charging semiconductor element 11 are ON/OFF controlled by controller 3.

Controller 3

Controller 3 is a protection circuit that turns ON input and output switch 2 when the battery pack can be used normally. This controller 3 includes detector 13 that detects voltage, current, temperature, etc. of secondary battery cell 1, control unit 14 that controls ON/OFF of input and output switch 2 based on battery information detected by this detector 13, and a communication unit 15 that transmits the battery information to a main device side. Detector 13 detects voltage of current detection resistor 16 connected in series with battery block 10 to detect charging and discharging current. Further, detector 13 detects temperature of secondary battery cell 1 from a signal input from temperature sensor 17 disposed in secondary battery cell 1 in a thermally coupled state.

Control unit 14 determines a state of secondary battery cell 1 from the voltage, temperature, etc. of secondary battery cell 1 detected by detector 13. Control unit 14 turns ON input and output switch 2 when secondary battery cell 1 can be charged and discharged normally, and turns OFF input and output switch 2 when secondary battery cell 1 cannot be used normally. For example, control unit 14 compares detected values such as the voltage and temperature of secondary battery cell 1 detected by detector 13 and remaining capacity calculated from detected current and voltage with a preset setting range, and turns OFF input and output switch 2 when the detected values exceed the setting range. Further, control unit 14 communicates the battery information detected by detector 13 with the main device side via communication unit 15.

In battery pack 100 in which charging semiconductor element 11 and discharging semiconductor element 12 connected in series to each other are ON/OFF controlled by controller 3, in a state of charging secondary battery cell 1, when the voltage of charging secondary battery cell 1 is higher than preset first overcharge detection voltage, or when the remaining capacity is larger than the maximum capacity, charging semiconductor element 11 is turned OFF to cut off charging current. Further, in a state of discharging secondary battery cell 1, when the voltage of secondary battery cell 1 is lower than minimum voltage, or when the remaining capacity is smaller than the minimum capacity, discharging semiconductor element 12 is turned OFF to cut off discharging current. Further, when the temperature of secondary battery cell 1 is higher than maximum temperature or lower than minimum temperature, charging semiconductor element 11 and discharging semiconductor element 12 are turned OFF to stop charging or discharging.

Fuse 5

Fuse 5 is connected in series to battery block 10 and protects secondary battery cell 1 from an excessive current flow. Fuse 5 is a molten metal heated by Joule heat and melted when overcurrent flows.

Charging Current Limiter 20

Furthermore, the battery pack includes charging current limiter 20 that limits charging current. Charging current limiter 20 is disposed in series on charging path CL, and has a charging first transistor for controlling charging current flowing through charging path CL and a charging second transistor for controlling operation of the charging first transistor. Operation of the charging second transistor is controlled by controller 3. Further, the operation of the charging first transistor is controlled via the charging second transistor controlled by controller 3. Controller 3 limits the charging current based on the charging current detected by the charging current detector and the charging voltage detected by the charging voltage detector.

Specifically, in a linear region of the charging second transistor, second ON resistance that is ON resistance of this charging second transistor is controlled. Here, a relationship between gate-source voltage $V_{GS}$ and drain-source ON resistance $R_{DS}$ of an FET when the FET is used for the charging first transistor and the charging second transistor is shown in a graph of FIG. 2. As shown in this graph, drain-source ON resistance $R_{DS}$ has a slope called a linear region. By using this linear region, a value of the second ON resistance of second FET 22 which is the charging second transistor can be varied, and simple ON/OFF switching, that is, control at an intermediate value other than 0 or 1 becomes possible.

Then, the charging first transistor is controlled by controlling this second ON resistance. Specifically, in a linear region of first FET 21 which is the charging first transistor, first ON resistance which is ON resistance of first FET 21 can be varied in a similar manner, so that a value of current flowing through first FET 21, that is, charging current for charging battery block 10 can be limited. In this way, controller 3 does not directly control the charging first transistor, but controls the charging current through the charging second transistor, by changing the second ON resistance of this charging second transistor in the linear region, and by similarly changing the first ON resistance of the charging first transistor in the linear region. Therefore, it is possible to perform fine charging control with a variable resistance value, as compared with conventional ON/OFF control of a transistor.

In addition, a load on a circuit side can be reduced compared to a configuration in which a controller directly drives an FET. In other words, when the FET is directly pulse width modulation (PWM)-controlled, charging current has a pulse shape, and an average value of pulse current is controlled by changing a duty ratio, so that a peak current value increases. Therefore, in a deteriorated state such as an end of charging of a secondary battery cell, the peak current value may exceed an allowable voltage value, which is not preferable. On the other hand, according to the present exemplary embodiment, since the charging current can be limited by adjusting the ON resistance, it is possible to suppress a peak current value, reduce a load on the secondary battery cell, and improve safety.

Constant Current/Constant Voltage Charging Control

Figure 3:
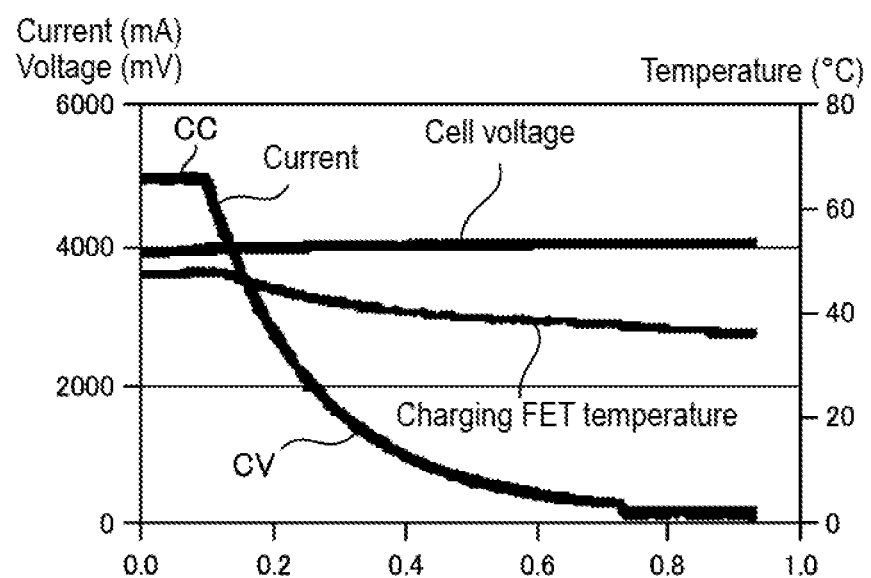
FIG. 3 is a graph showing an ideal state in which a battery pack is charged by constant current charging and constant voltage charging.

Here, the present exemplary embodiment will be described in comparison with a conventional charging control of method. Charging control of a battery pack is generally performed on a side of a charger that charges the battery pack. An ideal charging method is shown in a graph of FIG. 3. As shown in this drawing, constant current charging (CC) is initially performed, and then is switched to constant voltage charging (CV) to continue charging.

Figure 4:
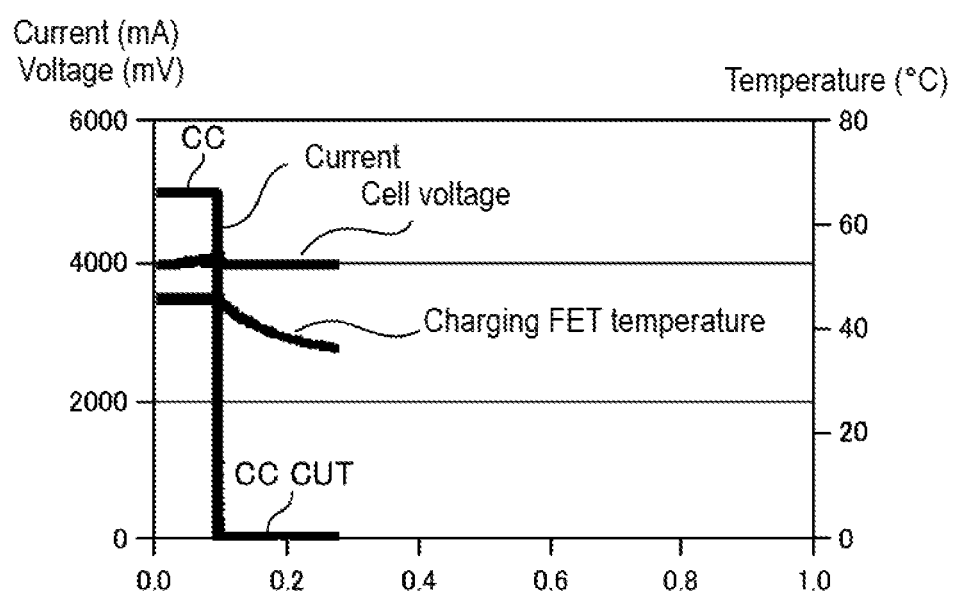
FIG. 4 is a graph showing changes in current and voltage with time according to a charging method in which a region of the constant current charging is omitted.

However, according to this charging control method, it may not be possible to charge the battery pack until capacity of a secondary battery cell is close to 100%. For example, consider a case where it is necessary to lower charge completion voltage of a secondary battery cell when the secondary battery cell has some abnormality or state change due to deterioration over time or the like. In such a case, since charging voltage is a fixed value in a conventional charging and discharging method, charging is continued at maximum voltage allowed for the secondary battery cell. However, since it is not possible to perform the charging, a charging FET is turned OFF to stop the charging. As a result, as shown in FIG. 4, the constant current charging is stopped before full charge, and charged battery capacity is reduced.

Figure 5:
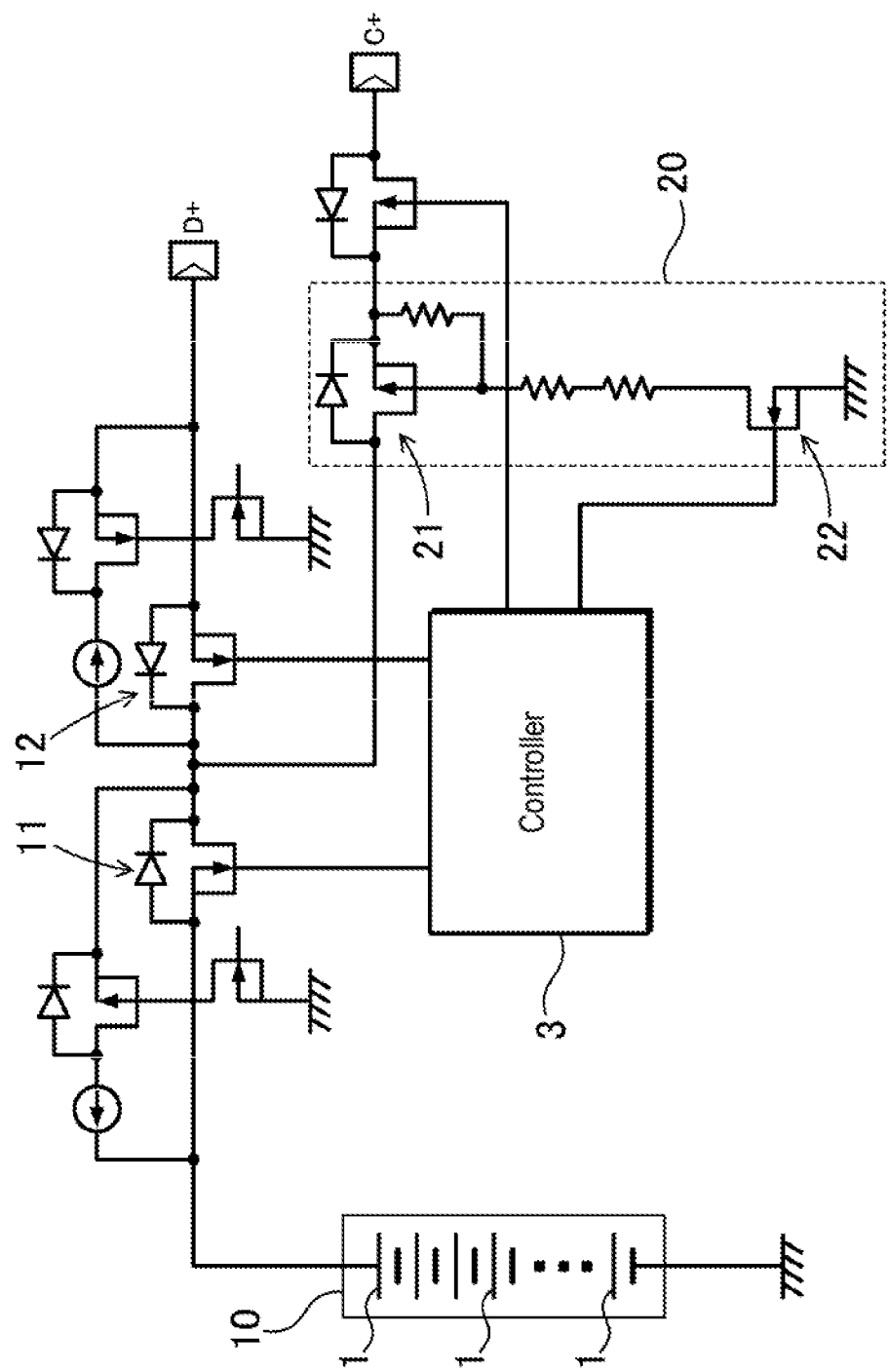
FIG. 5 is a circuit diagram showing an example of a charging circuit.
Figure 6:
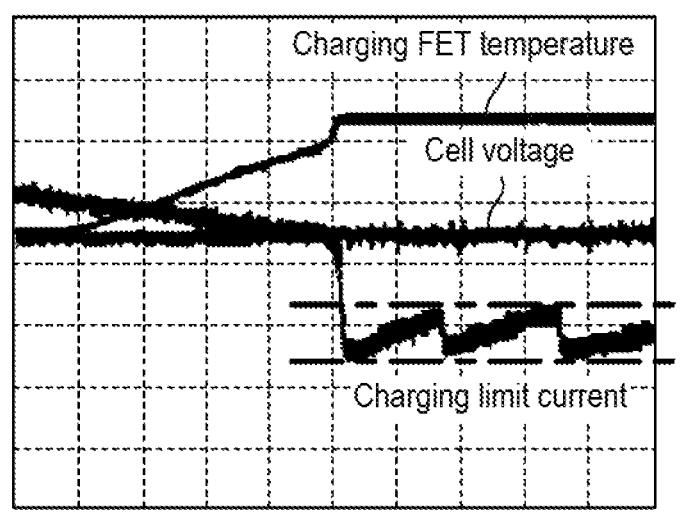
FIG. 6 is a graph showing a charging current waveform using the charging circuit of FIG. 5.

On the other hand, according to the present exemplary embodiment, since the charging current can be limited as described above, it is possible to charge to larger battery capacity while avoiding a situation where charging control is stopped during charging. This situation will be described based on FIGS. 5 and 6. In these drawings, FIG. 5 is a circuit diagram in which only a charging circuit portion of battery pack 100 is extracted, and FIG. 6 shows a charging current waveform using this charging circuit. As shown in the circuit diagram of FIG. 5, the charging circuit of the battery pack includes charging FET 11 that is the charging semiconductor element, first FET 21 that is the charging first transistor, and second FET 22 that is the charging second transistor, and controller 3. When the charging current is limited by using this charging circuit, controller 3 PWM-controls second FET 22 to control a resistance value of second FET 22. In other words, drive voltage of first FET 21 is controlled, and a resistance value of first FET 21 is controlled, thereby reducing an effective current value. As a result, battery block 10 can be charged while the charging current is limited as shown in FIG. 6.

Relaxation Circuit 25

Figure 7:
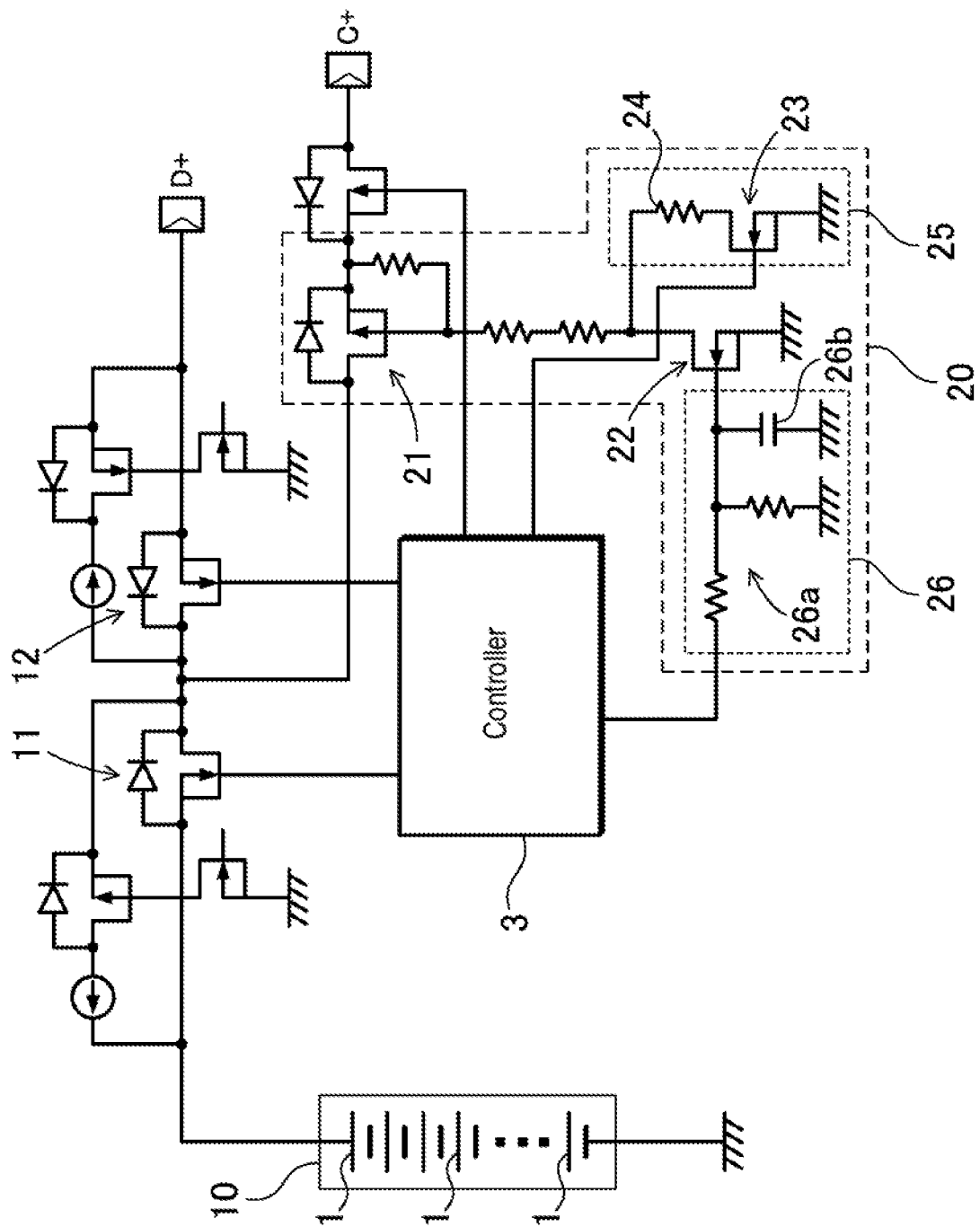
FIG. 7 is a circuit diagram showing an example of a charging circuit to which a relaxation circuit is added.
Figure 8:
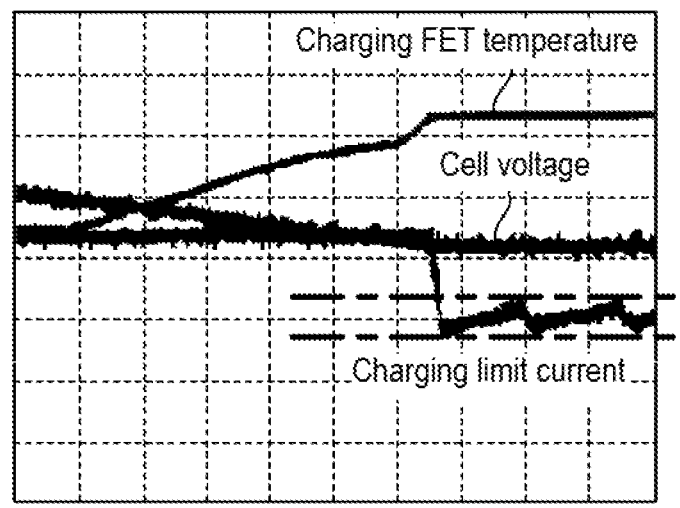
FIG. 8 is a graph showing a charging current waveform using the charging circuit of FIG. 7.

Further, the battery pack can be provided with relaxation circuit 25 that further suppresses ripples of the charging current. FIG. 7 shows an example of a charging circuit to which such relaxation circuit 25 is added. The charging circuit of the battery pack shown in this drawing has relaxation circuit 25 for relaxing an amount of change in the ON resistance of second FET 22. Here, third resistor 24 that relaxes fluctuations in the ON resistance of second FET 22 is connected in parallel between a drain and a source of second FET 22. By loading third resistor 24, the linear region of second FET 22 in FIG. 2 can be gently changed from the steep slope, as shown by a broken line. As a result, the linear region is relatively expanded, and it is possible to further suppress fluctuations in the charging current. As is clear from a graph of FIG. 8 showing a change in the charging current with time, it can be confirmed that a width of fluctuations of charging limit current is further suppressed as compared with the graph of FIG. 6. In this way, it is possible to obtain a waveform with less fluttering in which minute fluctuations in the charging current are further suppressed, and this makes it possible to suppress power loss of the FET and further suppress an amount of heat generation by the FET.

Further, it is preferable that relaxation circuit 25 be operated during charging. For example, a switch can be provided in series with third resistor 24. In the circuit example of FIG. 7, relaxation circuit 25 includes third resistor 24 and third FET 23, and third resistor 24 is connected to a drain side of third FET 23. As a result, controller 3 turns ON third FET 23 during charging to cause third resistor 24 to function and turns OFF third FET 23 except during charging, so that it is possible to disconnect relaxation circuit 25.

Note that when a bipolar transistor is used as the charging second transistor instead of the FET, the relaxation circuit can be omitted.

Low-Pass Circuit 26

Further, low-pass circuit 26 can be added to the charging circuit. In the example of the charging circuit in FIG. 7, as low-pass circuit 26, resistor 20a and capacitor 26b are provided in parallel between a gate and the source of second FET 22. By adding such low-pass circuit 26, it is possible to reduce influence of ripple voltage fluctuations due to the PWM control from controller 3.

Constant Power Charging Control

Figure 2:
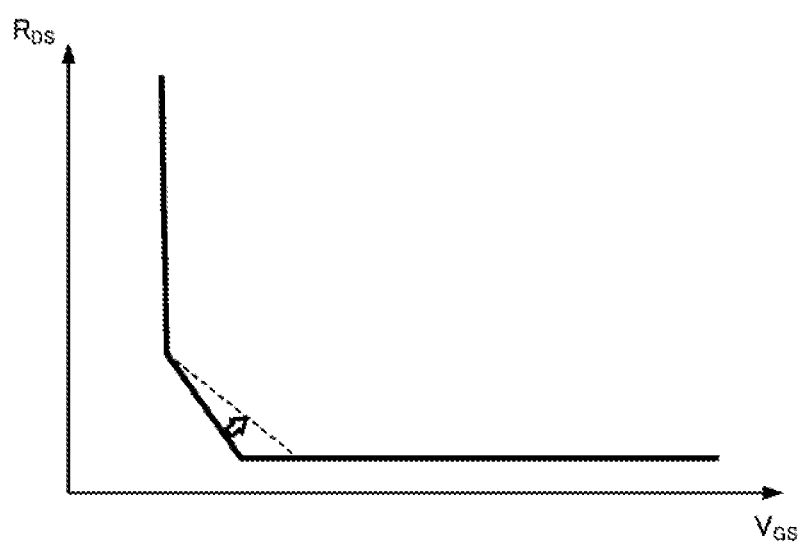
FIG. 2 is a graph showing a relationship between gate-source voltage and drain-source ON resistance of an FET.
Figure 9:
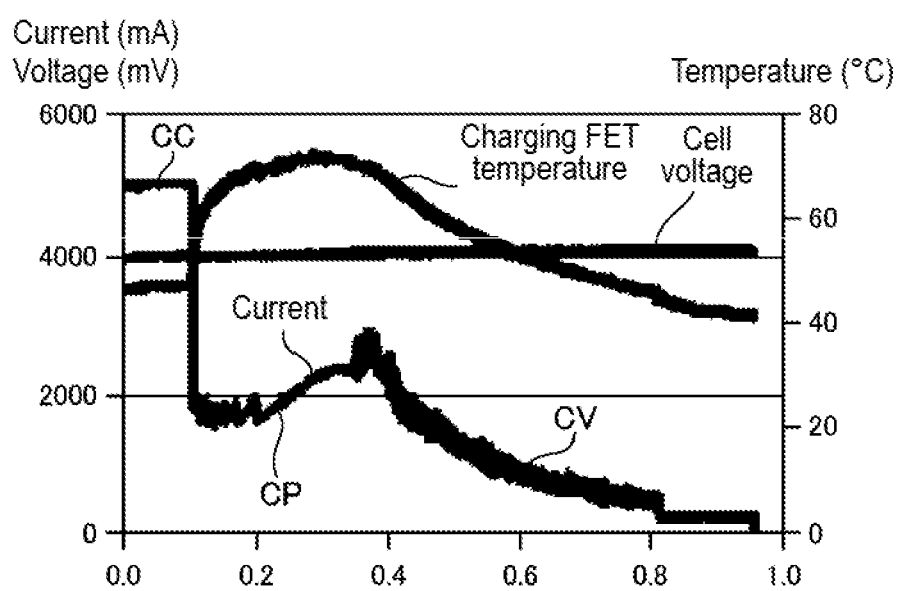
FIG. 9 is a graph showing how the battery pack is charged by constant power charging control.

Further, according to the battery pack according to the present exemplary embodiment, constant power charging control can also be performed. Here, how the constant power charging control is performed using the charging circuit in FIG. 7 will be described based on a graph in FIG. 9. In this charging control method, constant power charging (CP) is interposed between constant current charging and constant voltage charging, as compared with the charging control method in FIGS. 3 and 4. For example, when it is necessary to lower charge completion voltage due to deterioration over time of the battery block or the like, the constant current charging is stopped before full charge, as shown in FIG. 4. On the other hand, as shown in FIG. 9, charging can be continued by switching from the constant current charging to the constant power charging control, and further, more charging current can be supplied to the battery block and charging capacity can be increased quickly by switching from the constant power charging to the constant voltage charging. When the example of FIG. 2 is ideal charging, that is, charging capacity is 100% (5 A charging, charging ends at 200 mA), charging capacity is 92.3% (5 A charging, charging ends at 5 A (4.1 V)) in the constant current charging in FIG. 4. On the other hand, by combining the constant power charging shown in FIG. 9, it is possible to charge 99.9% (5 A charging, charging ends at 200 mA). Even when the charging completion voltage is lowered in this way, almost 100% charging is possible by combining the constant power charging. Note that a test is performed on a new battery pack that has not deteriorated in this example, and it is expected that a difference in charging capacity will become more remarkable on a deteriorated battery pack.

Figure 10:
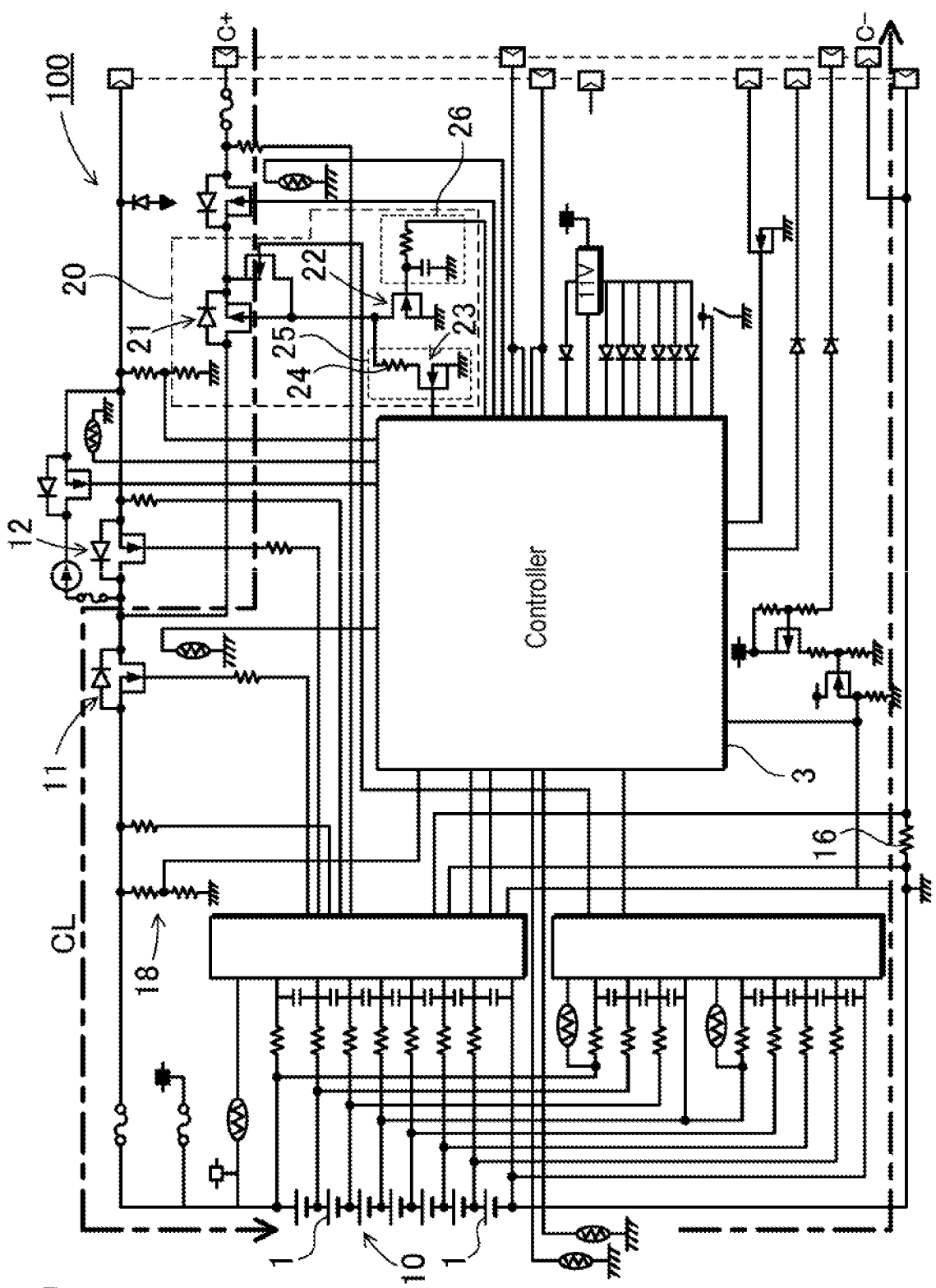
FIG. 10 is a circuit diagram showing a battery pack according to Example 1.

A specific circuit example of the battery pack according to the first exemplary embodiment is shown in FIG. 10. Battery pack 100 shown in this drawing includes charging current limiter 20 capable of adjusting charging current according to voltage of battery block 10. Specifically, battery pack 100 includes battery block 10, charging FET 11 that is the charging semiconductor element, discharging FET 12 that is the discharging semiconductor element, first FET 21, second FET 22, third FET 23, third resistor 24, controller 3, low-pass circuit 26, current detection resistor 16 disposed on the charging and discharging path, and voltage detection resistor 18 that is the charging voltage detector. Controller 3 is constituted of a microprocessor unit (MPU) or the like.

This battery pack controls second ON resistance of this charging end T22 by connecting charging terminals C+, C− with the charger. Thereby, gate voltage of first FET 21 connected to a drain side of second FET 22 can be controlled, and thus first ON resistance of first FET 21 can be controlled. Further, the first ON resistance of first FET 21 is monitored by measuring a current value by current detection resistor 16 disposed on charging path CL. Controller 3 implements constant, current charging by performing feedback control so that charging current has a desired value.

Controller 3 controls the second ON resistance of second FET 22 by PWM-controlling gate voltage of second FET 22. Thereby, the gate voltage of first FET 21 connected to the drain side of second FET 22 can be controlled, and thus the first ON resistance of first FET 21 can be controlled. Further, the first ON resistance of first FET 21 is monitored by measuring the current value by current detection resistor 16 disposed on charging path CL. Controller 3 implements the constant current charging by performing the feedback control so that the charging current has the desired value.

On the other hand, low-pass circuit 26 is provided on a gate side of second FET 22. This low-pass circuit 26 reduces influence of ripple voltage fluctuations due to the PWM control from controller 3. Low-pass circuit 26 can be configured by a low-pass filter such, as a CR circuit.

Expansion of Linear Region of Second ON Resistance

The relationship between gate-source voltage $V_{GS}$ and drain-source ON resistance $R_{DS}$ of the FET is shown in the graph of FIG. 2. As shown in this drawing, drain-source ON resistance $R_{DS}$ has the steep slope called the linear region. In order to expand this linear region as shown by the broken line, that is, to make the slope gentle, third resistor 24 is disposed in parallel between a drain and a source of first FET 21 in the circuit diagram of FIG. 10. This third resistor 24 is connected between a gate side of first FET 21 and a drain side of third FET 23. As a result, the linear region of the second ON resistance of second FET 22 can be widened and ripple fluctuations of the charging current can be reduced. Note that third resistor 24 is required when second FET 22 is PWM-controlled, and is not needed when second FET 22 is completely turned ON or OFF. Therefore, third FET 23 is provided so as to function third resistor 24 as necessary.

Thermal Control

By causing first FET 21 to function as a resistor in this way, it is possible to limit the charging current. On the other hand, when first FET 21 generates heat, it is considered that desired charging current cannot be passed. For example, when a secondary battery cell approaches end of life and a voltage value of the secondary battery cell is considerably lower than charging voltage, it is considered that voltage of first FET 21 becomes high and heat is generated. Therefore, in the example of FIG. 10, constant power charging to keep loss in first FET 21 constant is performed, so that capacity of first FET 21 can be maximized even in such a case.

Here, loss P of first PET 21 can be calculated by multiplying a difference between voltage $V_m$ output from the charger and voltage $V_{bat}$ of the secondary battery cell by charging current $I_{ch}$. Each value can be measured by voltage measurement using voltage detection resistor 18, voltage measurement by a voltage dividing resistor, and current detection by current detection resistor 16.

As described above, in the battery pack according to the present exemplary embodiment, the charging current, the secondary battery voltage, and the charging power supply voltage are measured and subjected to the feedback control, charging can be controlled to arbitrary charging current in an arbitrary state. In addition, it is possible to make maximum use of capacity of the charging FET that is responsible for current limitation.

INDUSTRIAL APPLICABILITY

The battery pack and the charging control method therefor according to the present invention can be suitably used as a chargeable and dischargeable battery pack for battery-driven devices such as laptop computers, mobile phones, portable DVD players, portable car navigation systems, portable music players, power tools, and assisted bicycles.

The invention claimed is:

1. A battery pack comprising:
   a battery block formed by connecting a plurality of secondary battery cells in series or in parallel to each other;
   a charging path that the battery block is charged;
   a charging current detector that detects charging current flowing through the charging path;
   a charging voltage detector that detects charging voltage applied to the charging path;
   a charging first transistor disposed in series on the charging path, the charging first transistor controlling the charging current flowing through the charging path;
   a charging second transistor that controls operation of the charging first transistor; and
   a controller that controls operation of the charging first transistor and the charging second transistor,
   wherein the charging voltage detector detects the charging voltage applied downstream of the charging first transistor and upstream of the battery block in the charging path, and
   wherein based on the charging current detected by the charging current detector and the charging voltage detected downstream of the charging first transistor and upstream of the battery block by the charging voltage detector, the controller adjusts the charging current for charging the battery block, by controlling second ON resistance that is ON resistance of the charging second transistor in a linear region of the charging second transistor, and by controlling first ON resistance that is ON resistance of the charging first transistor in a linear region of the charging first transistor using the second ON resistance.

2. The battery pack according to claim 1, further comprising a low-pass circuit connected to a gate side of the charging second transistor.

3. The battery pack according to claim 1, further comprising:
   a resistor connected in parallel between a source and a drain of the charging second transistor; and
   a charging third transistor connected in series with the resistor,
   wherein the controller controls the charging third transistor to be ON during charging so as to electrically connect the resistor in parallel between the source and the drain of the charging second transistor, thereby relaxing an amount of change in the ON resistance of the charging second transistor.

4. The battery pack according to claim 1, wherein the controller performs constant power control on the charging first transistor and controls to adjust the charging current of the battery block.

5. The battery pack according to claim 1, further comprising a charging semiconductor element disposed on the charging path in series with the charging first transistor, the charging semiconductor element controlling the charging current flowing through the charging path.

6. The battery pack according to claim 1, wherein the charging first transistor or the charging second transistor comprises an FET.

7. A charging control method for a battery pack that includes
- a battery block formed by connecting a plurality of secondary battery cells in series and/or in parallel to each other,
- a charging path where the battery block is charged,
- a charging current detector that detects charging current flowing through the charging path,
- a charging voltage detector that detects charging voltage applied to the charging path,
- a charging first transistor disposed in series on the charging path, the charging first transistor controlling the charging current flowing through the charging path,
- a charging second transistor that controls operation of the charging first transistor, and
- a controller that controls operation of the charging first transistor and the charging second transistor, the charging control method for the battery pack, comprising:

detecting charging current for charging the battery block by the charging current detector, and detecting charging voltage for charging the battery block by the charging voltage detector, said charging voltage being detected downstream of the charging first transistor and upstream of the battery block in the charging path; and adjusting the charging current for charging the battery block by the controller based on the detected charging current and the detected charging voltage detected downstream of the charging first transistor and upstream of the battery block, by controlling second ON resistance that is ON resistance of the charging second transistor in a linear region of the charging second transistor, and by controlling first ON resistance that is ON resistance of the charging first transistor in a linear region of the charging first transistor using the second ON resistance.

8. The charging control method according to claim 7, wherein the battery pack further comprises:
- a resistor connected in parallel between a source and a drain of the charging second transistor; and
- a charging third transistor connected in series with the resistor,
- wherein the controller controls the charging third transistor to be ON during charging so as to electrically connect the resistor in parallel between the source and the drain of the charging second transistor, thereby relaxing an amount of change in the ON resistance of the charging second transistor.

\* \* \* \* \*